July 5, 1932.  W. A. ABEGG  1,865,808
METHOD OF MAKING CONNECTIONS BETWEEN MACHINE PARTS
Original Filed March 12, 1928
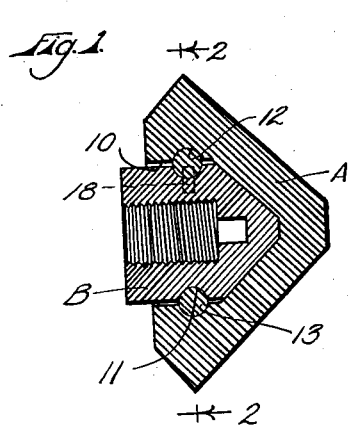
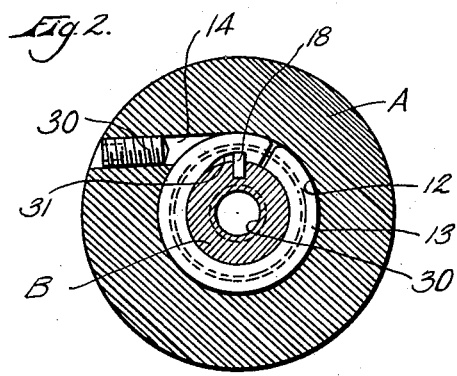
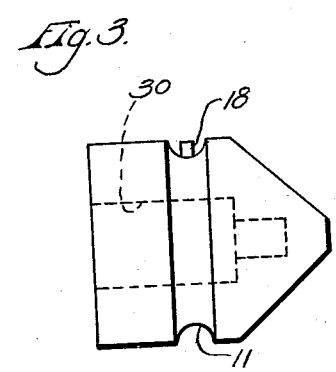
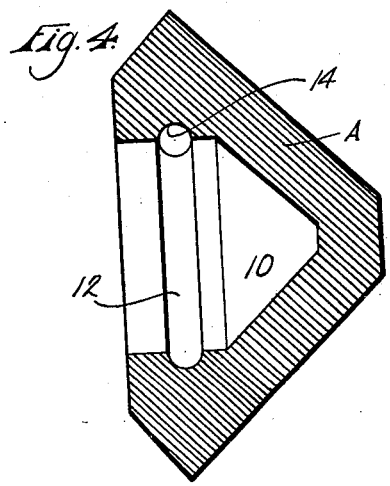
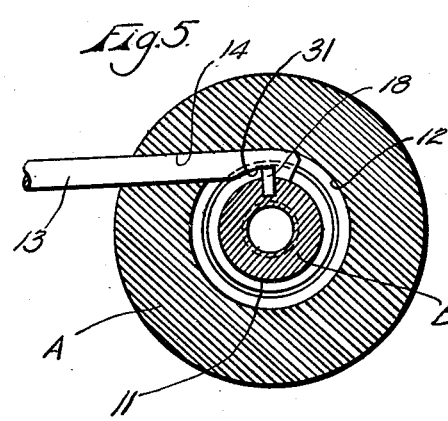
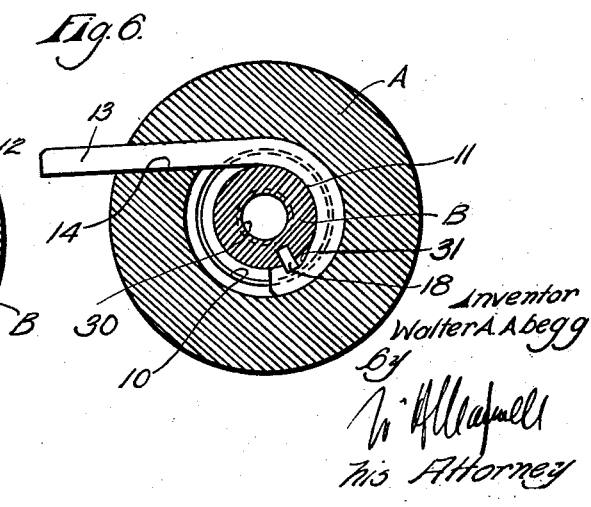
Inventor
Walter A. Abegg
by
his Attorney Patented July 5, 1932

1,865,808

UNITED STATES PATENT OFFICE

WALTER A. ABEGG, OF LOS ANGELES, CALIFORNIA, ASSIGNOR, BY DIRECT AND MESNE ASSIGNMENTS, TO WIEMAN KAMMERER WRIGHT CO., INCORPORATED, OF HOLLYDALE, CALIFORNIA, A CORPORATION OF CALIFORNIA

METHOD OF MAKING CONNECTIONS BETWEEN MACHINE PARTS

Original application filed March 12, 1928, Serial No. 261,057. Divided and this application filed December 14, 1929. Serial No. 414,046.

This invention relates to a method of making a connection between machine parts, or the like, and it is a general object of the invention to provide a simple, practical and economical method of making a connection of the type set forth and claimed in my co-pending application entitled Connection for machine parts, Serial No. 261,057, filed March 12, 1928.

This application is filed as a division of my co-pending application above identified.

In many machines and manufactures it is desirable or necessary to connect adjoining parts securely and so that there is no danger of the connection working loose or of its being broken either by use or deliberately. Connections of the type referred to occur or are desirable in various safe and lock constructions and throughout many other machines and manufactures. No attempt will be made to list the numerous situations in which the invention is useful nor to set forth the many obvious variations of the invention. I will confine the disclosure to one simple and typical application of the invention wherein it is used in making a connection between adjoining parts of a well boring tool, viz: a cutter, and it mounting bushing.

By the present invention a connection is made between two parts whereby the parts are connected so that they cannot possibly become separated through vibration or working of the parts, but are only separable upon failure or wearing out of the parts.

An object of this invention is to provide a method of making a connection of the character mentioned quickly and economically.

It is a general object of this invention to provide an improved commercially practical method of handling the parts entering into a connection of the character mentioned.

The various objects and features of my invention will be best and more fully understood from the following detailed description of a typical manner of the carrying out of the invention, throughout which description I refer to the accompanying drawing, in which:

Fig. 1 is a sectional view of a construction or assembly made in accordance with the present invention. Fig. 2 is a transverse sectional view of the parts shown in Fig. 1, being a view taken as indicated by line 2—2 on Fig. 1. Fig. 3 is an enlarged exterior elevation of one of the connected parts shown alone. Fig. 4 is an enlarged sectional view of the other part shown alone, and Figs. 5 and 6 are sectional views similar to Fig. 2 showing the connection in the course of being made.

The present invention is applicable to a wide variety of machines and manufactures and is useful, generally, in making a secure and permanent connection between adjoining parts, which connection may be such as to allow the parts to work relative to each other. For the purpose of illustration and without restricting the use of application of the invention, I will describe it as applied to making a connection between parts of a well drill, that is, the cutter and mounting bushing of a drill, and I will describe it in a form of the invention which forms a connection allowing the connected parts to rotate relative to each other.

It is believed that a clear understanding of the present invention will be aided by a description of the parts to be connected and the details of the finished connection.

The two parts A and B to be connected are adjoining or are fit together, preferably one into the other. Each of the parts is solid or integral, that is, it is without joints or detachable parts at or in connection with the joint or connection that I am about to described. In the drawing I have shown the part A as the outer part and in the form of a roller cutter suitable for a rock drill, or the like. The other or inner part B is shown in the form of a bushing adapted to form a mounting for the cutter A. The cutter A is substantially conical in shape and has an opening 10 formed in it from its base end to receive the bushing or inner part B. The bushing fits into the opening 10 with the desired clearance and is provided with a screw-threaded socket 30 to receive a stud or other mounting member. It is to be understood that the bushing and its receiving opening are round in cross section to permit the desired rotation of the cutter with reference to the bushing.

The connection includes a groove or seat 11 in the outer face or surface of the bushing B, a corresponding recess 12 in the wall of the opening 10 to register with the seat 11, and a connecting bar or member 13 arranged in the seat 11 and projecting into the recess 12. Where the parts are to rotate as they are in this case, the seat 11 is annular or continuous around the bushing B, while the recess 12 is likewise annular or continuous in the wall of the opening 10. The connecting member 13 is tightly seated in the seat 11 and preferably extends substantially the entire distance around the bushing B as shown in Fig. 2 of the drawing.

The method provided by my invention for the insertion of the locking member 13 into operating position provides the insertion of the member 13 between the parts A and B through a pipe 14 in one of the parts and the wrapping of the member around the bushing B by relative rotation between the parts A and B. In the construction shown the passage 14 is in the outer part or cutter A and is tangentially disposed with reference to the opening formed by the seat 11 and recess 12. The passage 14 is of sufficient size to pass the member 13. The desired feed of the member 13 into place around the bushing B is accomplished by arranging the member 13 so that the end entering the passage 14 is held by the bushing B or is attached to the bushing B so that relative rotation between the bushing and cutter causes the member 13 to be drawn into place through the passage 14 and wrapped onto the bushing B. In the particular construction illustrated, the member 13 is in the form of a straight bar as it is passed through the passage 14 and is notched at its forward or entering end to receive a projection or pin 18 projecting from the bushing into the seat 11. The manner in which the pin projection 18 engages the notch 31 in the member 13 at the start of the operation will be readily understood from inspection of Fig. 5 of the drawing. Fig. 6 of the drawing shows the operation partially completed at which time a part of the member 13 is wrapped around the bushing B, while a part is still straight and in the passage 14. In Fig. 2 of the drawing the member is shown wrapped completely around the bushing B, it being obvious that the member 13 is proportioned so that it extends substantially the entire distance around the bushing.

To thus apply the member 13 it is obvious that it must be more or less malleable or pliable otherwise it could not be worked from the straight condition in which it passes through the passage 14 to the curved or annular condition in which it surrounds the bushing B.

In carrying out the invention I prefer to use a member 13 of metal or material sufficiently malleable to allow it to be thus wrapped around the bushing B. In accordance with the preferred form of the invention, I use iron, steel or other metal which, under normal conditions, is not sufficiently malleable to permit of the wrapping operation necessary in applying the member to the bushing. This metal member 13 is heated to a temperature which permits of it being worked or readily bent and, while in the heated condition, it is inserted through the passage and wrapped around the bushing by relative rotation between the bushing and cutter. As the member 13 thus applied cools, it shrinks onto the bushing and therefore becomes set or fixed on the bushing. The shrinkage of the member 13 further causes it to free itself from the recess in the cutter, allowing the cutter to be free to rotate on the bushing. It will be apparent that the member 13 can in this manner be applied to the parts to securely connect them together without preheating the parts or otherwise handling them in a manner that might warp them or destroy their temper. When the member 13 has been wrapped onto the bushing as shown in Fig. 2 the passage 14 may be closed by a plug 30, or the like.

From the foregoing description it will be obvious that my invention makes a connection which is secure and dependable and which is totally without screw-threaded or other like joints subject to becoming loose. It will also be apparent that the connection is permanent, and in the case of lock or safe constructions is such that it cannot be opened by ordinary methods or tools. A removal of the plug 30, through which the connecting member is arranged in place, will not permit of the member 13 being withdrawn as the member 13 cannot be engaged to withdraw it and, further, the member 13, when shrunk on the bushing, can only be removed by cutting or destroying the parts.

Having described only a typical preferred manner of carrying out my invention, I do not wish to limit myself to the specific details set forth, but wish to reserve to myself any changes or variations that may appear to those skilled in the art or fall within the scope of the following claims.

Having described my invention, I claim:

1. The method of connecting two parts one fitting around the other and having a space between them including heating a body of metal that is rigid at normal temperatures until it is malleable, introducing the heated body into said space to conform to the shape of the space, and then allowing the body of metal to cool and contract to tightly grip the said other part.

2. The method of connecting two parts one fitting around the other and having a space between them curved about their centers including heating a bar of metal that is rigid at normal temperatures to render it malleable, introducing the heated bar into the space through an opening in the outer part, connecting the entering end of the heated bar with the inner part, rotating one part relative to the other to cause the bar to be drawn into the space, and then allowing the bar to cool and shrink onto the inner part to be immovably connected therewith.

3. The method of connecting two parts one fitting around the other and having a space between them curved about their centers including, heating an elongated body of metal that is rigid at normal temperatures to render it malleable, bending the said body while hot around the inner part to occupy the space, and then allowing the said body to shrink onto the inner part as it cools to permanently grip the inner part.

4. The method of connecting two parts one fitting around the other and having a space between them curved about their centers including, heating a normally rigid rod to render it malleable connecting one end of the heated rod to one of the parts and moving the parts so that the rod is drawn into the space between the parts, and then allowing the rod to cool to shrink onto and permanently grip the said other part.

5. The method of connecting two parts one fitting around the other and having a space between them curved about their centers including, heating a normally rigid rod to render it malleable connecting one end of the heated rod to the inner part and moving the parts so that the rod is drawn into the space between the parts, and then allowing the rod to cool to permanently shrink onto the inner part.

6. The method of connecting two parts one fitting around the other and having a space between them including heating a bar of metal having a relatively high melting point and that is rigid at normal temperatures to render it malleable, introducing the heated bar into the space through an opening in one part, bending the heated bar around the inner part, and then allowing the bar to shrink onto the inner part.

In witness that I claim the foregoing I have hereunto subscribed my name this 6th day of December, 1929.

WALTER A. ABEGG.